United States Patent [19]

Kupper et al.

[11] Patent Number: 4,705,691

[45] Date of Patent: * Nov. 10, 1987

[54] BEVERAGE OPACIFIER

[75] Inventors: Philip L. Kupper; Dan R. Morgan, both of Cincinnati, Ohio

[73] Assignee: The Procter & Gamble Co., Cincinnati, Ohio

[ * ] Notice: The portion of the term of this patent subsequent to Nov. 10, 2004 has been disclaimed.

[21] Appl. No.: 799,370

[22] Filed: Nov. 18, 1985

[51] Int. Cl.$^4$ ................................................ A23L 2/00
[52] U.S. Cl. .................................... 426/590; 426/611; 426/654
[58] Field of Search .................. 426/590, 330.3, 330.5, 426/333.6, 330, 569, 599, 601, 602, 611, 616, 650, 651, 654, 250, 804

Primary Examiner—Raymond N. Jones
Assistant Examiner—Carolyn Paden
Attorney, Agent, or Firm—Eric W. Guttag; Ronald L. Hemingway; Richard C. Witte

[57] ABSTRACT

A beverage opacifier is disclosed which comprises (a) one or more substantially saturated fat as a clouding agent, and (b) one or more weighting agent. The beverage opacifier can be used as an emulsion containing (a) from about 0.1% to about 25% clouding agent, (b) from about 1% to about 30% emulsifier, (c) from about 1% to about 20% of a weighting agent, and (d) from about 25% to about 97.9% water. This invention also includes said beverage opacifiers combined with a flavor oil or emulsion. This invention further comprises beverage concentrates, and carbonated or non-carbonated beverages containing these beverage opacifiers.

31 Claims, 2 Drawing Figures

BEVERAGE OPACIFIER

TECHNICAL FIELD

The present invention relates to beverage opacifiers containing clouding and weighting agents which can be used in carbonated and noncarbonated beverages.

BACKGROUND OF THE INVENTION

Natural fruit juices contain pectin or similar cellulosic materials which are suspended in the juice. This suspension is known as "cloud". A cloudy appearance is important to juice-flavored beverages, particularly citrus juices, because it provides the apperance of natural fruit juice to the consumer. The appearance of cloud is created by the interaction and diffusion of light by suspended fine particles of an emulsion. The inclusion of a clouding agent in the emulsion enhances the opacity.

The clouding agent is usually a colloidal material and is often combined with flavorings. It is typically added to the beverage in the form of an aqueous emulsion. A water-soluble emulsifier, such as a gum or modified food starch, is added to create an emulsion between the clouding agent and flavoring oils. During the emulsification process, the water-insoluble clouding agent is formed into small particles. The emulsifier coats the particularized clouding agent and prevents coalescence of the clouding agent, maintaining the emulsion.

With time, the clouding agent emulsion can separate from the beverage and form an oil ring at the top of the container, or sediment at the bottom of the container. The conventional solution to this problem is to mix the clouding agent with a weighting agent, traditionally a brominated vegetable oil, to provide stability.

The weighting agent has a high specific gravity and is mixed with flavor oils and clouding agents to increase the specific gravity of the resulting mixture to be approximately equal to that of the beverage. The weighting oil thereby prevents migration of the beverage opacifier to the surface of the beverage.

Examples of traditional clouding agents include citrus oils which are largely composed of terpenes and smaller amounts of sesquiterpenes, and citrus peel oils which are contained in oval, balloon-shaped oil sacs located in the outer rind of the fruit adjacent to the chromoplasts. Citrus peel oils are composed of mixtures of terpenes, aldehydes, esters, acids, alcohols, ketones, esters and phenols. The terpenes contained in citrus oils and citrus peel oils will impart a cloudy effect on the beverage.

Unfortunately, many commercial opacifiers can impart a discernible off-taste to the final beverage. For example, those opacifiers prepared from such clouding agents as citrus terpenes, possess an inherent citrus taste and can develop an acid catalyzed oxidized off-flavor in the beverage. A clouding agent which is not subject to oxidative degradation and corresponding off-flavor is needed.

It is therefore an object of the present invention to provide a beverage opacifier which achieves the desirable appearance of the presence of citrus juice in the beverage without imparting any off-flavor or unacceptable odor to the beverage.

It is a further object of this invention to provide an effective beverage opacifier with an extended shelf life because it is not subject to oxidative degradation and resultant off-flavors.

It is a further object of this invention to provide beverage concentrates, beverage syrups, carbonated beverages and noncarbonated beverages containing a beverage opacifier which does not impart any off-flavor and which is not subject to oxidative degradation.

These and other objects of this invention will be obvious from the following descriptions and examples.

SUMMARY OF THE INVENTION

Figure 1:
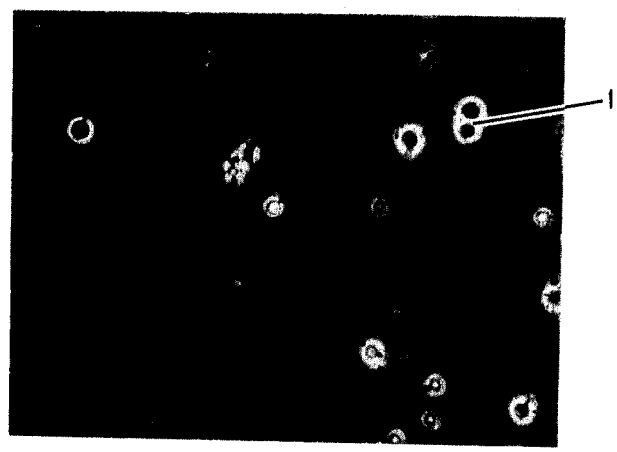
FIG. 1 depicts a photomicrograph of an emulsion containing glyceryl tri-caprylate/caprate and a brominated sucrose fatty acid polyester oil after one pass through a Gaulin Homogenizer.

The present invention relates to a beverage opacifier comprising (a) a clouding agent comprising one or more triglyceride fats, and (b) one or more weighting agents. The ratio of clouding agent to weighting agent is from about 250:1 to about 1:2. A beverage opacifier emulsion is disclosed which comprises (a) from about 0.1% to about 25% by weight of a clouding agent comprising one or more triglyceride fats; (b) from about 1% to about 30% by weight emulsifier, gum, or modified food starch; (c) from about 1% to about 20% by weight of a weighting agent; and (d) from about 25% to about 97.9% by weight water. The ingredients are combined in such a manner that they add up to 100%. A particularly preferred clouding agent for use in the above opacifier or emulsion comprises glyceryl tri-caprylate/caprate. This invention further comprises beverage concentrates, beverage syrups, and carbonated or noncarbonated beverages containing these beverage opacifiers.

DESCRIPTION OF THE PREFERRED EMBODIMENT

This invention comprises the use of triglyceride fats or oils as clouding agents in beverage opacifiers for carbonated or noncarbonated beverages. Surprisingly, it has been discovered that when triglyceride fats or oils which are substantially saturated are employed as clouding agents the result is a neutral, stable, and non-ringing beverage opacifier. These neutral clouding agents do not possess the inherent limitations of conventional citrus terpene clouding agents, i.e., an oxidized terpeney off-taste.

The clouding agent employed in this invention comprises one or more edible triglyceride fats or oils which reflect light and which have a specific gravity less than that of the beverage in which the clouding agent is to be used. When the clouding agent is combined with a weighting agent, the resulting beverage opacifier imparts a total or partial opaque effect to a beverage without separating or falling out. The beverage opacifier provides the appearance of juice in a beverage to the consumer.

Any of a variety of fats or oils can be employed as the clouding agent, provided that the fat or oil is suitable for use in foods and beverages. Preferred are those fats and oils which have been refined, bleached and deodorized to remove off-flavors. Refining, bleaching and deodorizing are well-known processes for fats and oils. Specific reference to such treatments can be found in D.

Swern, Ed., *Bailey's Industrial Oil and Fat Products.* 3rd Ed., Interscience Publishers (1964).

The term "fats" used herein shall refer to edible fats and oils comprising triglycerides, fatty acids, fatty alcohols, and esters of such acids and alcohols. Especially appropriate for use in the present invention are triglycerides of straight chain or branched chain saturated monocarboxylic acids having from about 4 to about 24 carbon atoms. Suitable sources of such fats which can be used as clouding agents are: (1) vegetable fats such as soybean, apricot kernel, olive, corn, safflower, sunflower, cottonseed, canola, rapeseed, sesame seed, nasturtium seed, tiger seed, rice bran, wallflower, and mustard seed, (2) animal fats such as tallow, lard and lanolin, (3) marine fats such as menhaden, pilcherd, sardine, whale, or herring, (4) nut fats such as coconut, palm, palm kernel, babassu kernel, or peanut (5) milk fats (butterfat), (6) cocoa butter and cocoa butter substitutes such as shea or illipe butter, and (7) synthetic fats.

Especially suitable for use as clouding agents are those fats which are organoleptically neutral and are readily miscible with a suitable weighting agent. These include fats from the following sources: vegetable fats such as soybean, corn, safflower, sunflower, cottonseed, canola, and rapeseed; nut fats such as coconut, palm, and palm kernel; and synthetic fats.

Unsaturated fats are subject to oxidative degradation, as are the terpenes. Therefore, fats suitable for use herein are substantially saturated fats. "Substantially saturated" is used herein to mean a fat that is less than 100% but predominantly saturated. Preferred are those fat with an iodine value of less than 25, most preferably with an iodine value of less than 8. The more fully saturated the fat is, the less subject it is to oxidative degradation. Thus fully saturated fats are most preferred.

A fat having a sufficiently low iodine value may be obtained by either (1) hydrogenating, or by (2) blending of fats of different iodine values. Hydrogenation can be carried out by conventional methods and usually consists of a batch process whereby the fat composition is contacted with hydrogen in the presence of a nickel catalyst. The solids content of a fat can also be increased by adding to it a small amount of the corresponding fat already saturated to a lower iodine value. The iodine value of a fat indicates the number of grams of iodine equivalent to the halogen absorbed by a 100 gram sample. In general, the lower the iodine value of a given fat, the greater will be its solids content at a given temperature, and the more saturated it will be. The iodine value can readily be determined by known methods.

Also preferred are saturated fats which are liquid at room temperature. Solid fats require heating to achieve liquidity prior to any blending with a flavor or weighting oil and can solidify if the beverage is cooled below the melting point of the fat. The melting points of saturated fatty acids increase as the carbon chain length is increased. Fats of the coconut oil type which contain large proportions of $C_6$ to $C_{12}$ acids have low melting points compared to fats containing longer chain length acids and are especially suitable for use herein. Examples include fats containing caproic (hexanoic) and caprylic (octanoic) acids such as milk fats, and coconut and palm kernel oils. Also fats containing capric (decenoic) acid such as milk fats and Palmae seed oils are appropriate for use herein.

Fats or mixed fatty acids may be fractionated to obtain a specific fat having the desired characteristics. Fractionated coconut oil is especially suitable for use in the present invention. Lower melting fractions can be obtained by means of thermal fractionation processes in which the higher melting fraction is removed. The desired low melting fraction can be separated and then hydrogenated to the desired iodine value.

Most preferred is glyceryl tri-caprylate/caprate, an almost completely saturated triglyceride having an iodine value of one. It is made by esterification of from about 55% to about 60% by weight caprylic acid and from about 45% to about 40% by weight of capric acid with glycerine. Glyceryl tri-caprylate/caprate is a liquid at room temperature.

Any suitable weighting oil can be employed in the beverage opacifier of the present invention. Typical weighting oils can include brominated vegetable oil, glycerol ester of wood rosin (ester gum), sucrose acetate isobutyrate (SAIB) and other sucrose esters, gum damar, colophony, gum elemi, or others known to those skilled in the art. Particularly preferred are brominated liquid polyol polyesters due to their nonabsorption property.

The brominated liquid polyol polyesters comprise edible nonabsorbable, nontoxic, nondigestible, liquid brominated polyol fatty acid polyester, having at least four fatty acid ester groups, wherein the polyol is selected from the group consisting of sugars and alcohols containing at least 4 hydroxyl groups, and wherein each fatty acid group has from about 8 to about 22 carbon atoms. These types of nonabsorbable oils are disclosed in U.S. Pat. No. 3,600,186, issued Aug. 17, 1971 to Mattson and Volpenhein.

Brominated polyol fatty acid polyester compounds that contain three or less fatty acid ester groups are digested in the intestinal tract much the same as conventional polyol fatty acid polyester compounds containing three or less fatty acid ester groups, and much the same as ordinary triglyceride fats, and are thus absorbed from the intestinal tract as well. Brominated polyol fatty acid polyester compounds that contain four or more fatty acid ester groups are substantially nondigestible and consequently nonabsorbable by the human body. It is not necessary that all of the hydroxyl groups of the polyol be esterified with fatty acid, but it is preferable that the polyester contain no more than two unesterified hydroxyl groups. Most preferably, substantially all of the hydroxyl groups of the polyol are esterified with fatty acid, i.e., the compound is substantially completely esterified. The fatty acids esterified to the polyol molecule can be the same or mixed, but, as noted above, a substantial amount of the unsaturated acid ester groups must be present to provide liquidity and permit bromination.

The brominated polyol fatty acid polyesters can be prepared by a variety of methods well known to those skilled in the art. These methods include: transesterification of the polyol with methyl, ethyl or glycerol fatty acid esters, using a variety of catalysts; acylation of the polyol with a fatty acid chloride; acylation of the polyol with a fatty acid anhydride; and acylation of the polyol with a fatty acid, per se. The Rizzi and Taylor method of U.S. Pat. No. 3,963,699, mentioned above, and as further described in their article in *Journal of the American Oil Chemists Society,* 55:398 (1978), is particularly useful, and the disclosures of that patent are hereby incorporated herein in their entirety by reference.

In addition, the subsequent work of R. A. Volpenhein, disclosed in two U.S. Pats. Nos. 4,517,360 and 4,518,772, issued May 14, 1985 and May 21, 1985, respectively, has shown that the Rizzi and Taylor synthesis can be further improved by using potassium carbonate, sodium carbonate, or barium carbonate as the catalyst, and/or using significantly higher soap:polyol mole ratios than those originally envisioned and shorter reaction times.

The fatty acid polyesters can then be brominated by any of several methods known to those skilled in the art. For example, elemental bromine in a suitable solvent such as carbon tetrachloride, ethyl acetate, petroleum ether, and the like, are commonly employed for reaction with olefins to form 1,2-dibromides. The specific gravity of the brominated polyester is a function of the amount of bromine incorporated into the molecule.

A beverage opacifier is prepared by mixing the clouding agent with a weighting agent. The ratio of clouding agent to weighting agent is from about 250:1 to about 1:2. Preferably, the ratio is from 50:1 to 1:1 and most preferably from 5:1 to 1:1.

A beverage opacifier emulsion is prepared by mixing the clouding agent with a weighting agent, emulsifier and water. The emulsion contains from about 1% to about 20% weighting oil, from about 0.1% to about 25% clouding agent, from about 1% to about 30% emulsifiers, and from about 25% to about 97.9% water, quantum satis. All percentages are by weight. Other suitable ingredients such as flavors, color, acid or a preservative can be incorporated into the emulsion if desired. Clouding and weighting agents suitable for use in the emulsion are the same as those previously discussed for the beverage opacifier.

Emulsifiers suitable for use in the opacifier emulsion of the present invention include water-soluble materials such as vegetable gums and starches. Examples include gum acacia, modified food starch, carboxymethylcellulose, gum ghatti, modified gum ghatti, xanthan gum, tragacanth gum, guar gum, or other suitable gums. The emulsifier comprises from about 1% to about 30% by weight of the opacifier.

The particle size of the water-insoluble components of the emulsion is reduced employing suitable apparatus known in the art. Because the ability of emulsifying agents to hold oil in suspension is proportional to particle size, emulsions of particles with diameters of about 0.1 to about 3.0 microns are suitable for use in this invention. Preferably, the particles are about 2.0 microns or less in diameter. Most preferred is an emulsion in which substantially all the particles are 1.0 microns or less in diameter. The particle size is reduced by passing the mixture through an homogenizer, colloid mill or turbine-type agitator. Usually one or two passes is sufficient.

The beverage opacifier or opacifier emulsion can be used in combination with a flavor component at a level of from about 0.1% to about 50% by weight. The flavor component can comprise one or more suitable flavor oils, extracts, oleoresins, essential oils and the like, known in the art for use as flavorants in beverages. This component can also comprise flavor concentrates such as those derived from concentration of natural products such as fruits. Terpeneless citrus oils and essences can also be used herein. Examples of suitable flavors include fruit flavors such as orange, lemon, lime and the like, cola flavors, tea flavors, coffee flavors, meat, fish, or poultry flavors (for soups), vegetable flavors, chocolate flavors, dairy flavors, and others. The flavors can be derived from natural sources such as essential oils and extracts, or can be synthetically prepared. The flavor component typically comprises a blend of various flavors and can be employed in the form of an emulsion, alcoholic extract, or spray dried.

A flavor emulsion is typically prepared by mixing flavoring oils (0.001% to 20% by weight) with an emulsifying agent (1% to 30% by weight) and water in the same manner as the opacifier emulsion is prepared. Emulsions of particles with diameters of about 0.1 to about 3.0 microns are suitable for use in this invention. Preferably, the particles are about 2.0 microns or less in diameter. If the particle size is not substantially uniform, the emulsion has a limited shelf-life as separation of the flavor oil in the finished product may occur. The emulsifying agent coats the particularized flavor oil to aid in preventing coalescence and in maintaining an appropriate dispersion. The viscosity and specific gravity of the flavor emulsion are regulated to be compatible with the finished beverage.

The flavor or flavor emulsion is then mixed with the components of the beverage opacifier. The amounts of flavor or flavor emulsion and beverage opacifier vary depending upon the beverage formula and the proper proportions can be calculated by those skilled in the art. Generally, from 0.001% to about 1% by weight of flavor emulsion in the final beverage is used.

Carbonated and noncarbonated beverages, beverage concentrates, and beverage syrups, can be made using the beverage opacifiers of the present invention as a component. Included are fruit juices; beverages containing fruit juice such as ades, punches, or the like; ready-to-drink flavored sweetened or diet beverages such as cola, orange, lemon-lime, and other similar flavored soda or soft drinks; vegetable beverages; meat, poultry, or fish broth beverages; milk; coffee and teas; and isotonic (energy) drinks. Beverage concentrates or syrups include the above-listed beverages prior to dilution to drinking strength such as fountain syrups or concentrates used in beverage manufacture.

It is well known in the art that a beverage concentrate in the amount of 1 gallon can yield up to approximately 200 gallons of syrup of 1200 gallons of finished beverage. Each gallon of syrup would yield approximately 6 gallons of finished beverage. In a concentrate, the beverage opacifier or emulsion is present in an amount of from about 1% to about 75% by weight. In a syrup the beverage opacifier or emulsion is present in an amount of from about 0.005% to about 0.4% by weight. The beverage opacifier or emulsion comprises from about 0.0008% to about 0.1% of the final beverage.

Transparent or lemon-lime beverages are manufactured from terpeneless citrus oils. Terpenes are basically insoluble in dilute ethyl alcohol, whereas the oxygenated components, e.g. aldehydes, ketones, esters, acids, etc., are largely soluble. This difference in solubilities allows terpeneless (water-soluble) extracts to be prepared. Terpeneless citrus oils can also be prepared by distillation or chromatographic separation. The resultant transparent finished beverage contains citrus flavor without cloud. The beverage opacifier of this invention can be added to such a transparent beverage to impart cloud.

The opacifier of this invention can be spray-dried. The beverage opacifier emulsion is an oil-in-water emulsion in which the emulsifier encapsulates the clouding agent. When the water is removed by spray drying, the clouding agent droplets are sufficiently coated to prevent their evaporation or oxidation upon exposure to the atmosphere. Typically, when preparing a beverage opacifier emulsion for spray drying, the specific gravity of the oil phase and emulsion cloud are not of primary importance. The beverage made with a spray-dried opacifier is generally consumed shortly after its preparation and therefore long shelf life is unimportant.

Spray-drying can be accomplished by spraying the emulsion into a tower and simultaneously contacting it with a flow of hot air, conventionally from about 350° F. to about 650° F. Water is removed from the encapsulated oil droplets as they fall through the spray tower and they emerge from the bottom as encapsulated particles. Any conventional encapsulation technique for spray drying can be used herein.

It can be appreciated that other executions of this invention can be devised without departing from its scope and spirit and without losing its advantages. In particular, use of saturated fats as beverage clouding agents provides neutral, stable opacifiers. It is recognized that other additives to aid in clouding, such as titanium dioxide, can be employed in the present invention so long as oxidation of the opacifier is not enhanced.

The following examples illustrate the invention described herein, but are not intended to define the limits thereof. All percentages are by weight unless otherwise stated.

EXAMPLE 1

Example 1 demonstrates the preparation of the beverage opacifier of the present invention.

A first solution was made by the following procedure:

Sodium benzoate (1.2 g.) was added to 600 ml. of distilled in a 1 liter beaker. The mixture was agitated until the sodium benzoate was completely dissolved. The solution was then vigorously agitated with a motor-driven variable speed mixer, Lightnin$^R$ Series 20 with conventional propeller blades, and positioned so as to minimize air incorporation, while 239.68 g. of spray dried gum arabic was slowly added. The agitation continued for 4 hours. The mixture was then allowed to stand overnight. The following morning 26.96 g. of anhydrous citric acid was dissolved in the mixture.

Simultaneous with the preparation of the above mixture a second solution was made by the following procedure:

A sucrose polyester is prepared from safflower oil according to U.S. Pat. No. 3,600,186 of Mattson et al, issued Aug. 17, 1971. The polyester had a specific gravity of 0.95 and an iodine value of 19. This polyester was then brominated as follows: Two hundred sixty g. of the polyester was added to 200 ml. water and 60 ml. petroleum ether contained in a 2 liter flask. The mixture was vigorously stirred with a motor-driven Teflon paddle and 80 ml. of liquid bromine was added dropwise over 4 hours with ice bath cooling. The ice bath was then removed and the mixture was stirred for a further 18 hours. The solvent was then removed using a rotary evaporator. The residue was dissolved in 3 liters of ethyl ether and dried by the addition of an anhydrous magnesium sulfate. After removal of the magnesium sulfate by filtration and the ether by rotary evaporation, the remaining traces of solvent were removed by steam stripping. The residue was gently heated on a steam bath while being flushed with dry nitrogen gas. Following this procedure, the product was dried and deodorized by rotary evaporation under high vacuum.

Glyceryl tri-caprylate/caprate (166.82 ml.) was added to 67.62 g. of the brominated sucrose polyester in a 500 ml. beaker. The specific gravity of the brominated fatty acid polyester was 1.44. To assure miscibility, this mixture was moderately agitated with a motor-driven variable speed mixer, Lightnin$^R$ Series 20 with conventional propeller blades. By use of a specific gravity hydrometer calibrated at 60° F., the specific gravity of this second mixture was found to be 1.060 at 60° F.

The above two solutions were mixed under moderate agitation and then quantified to precisely 1.0 liter by the addition of distilled water. This mixture was then agitated for 4 hours allowed to sit undisturbed for 1 hour, and then again agitated for 15 minutes to assure uniform particle distribution prior to homogenization.

The solution was then homogenized on a Gaulin homogenizer Model 15M Laboratory Homogenizer where the first stage of the operating pressure was set at 4500 lbs. and the second stage of the operating pressure was set at 500 lbs, for a total pressure of 5000 lbs. The particle size was then determined via microscopic evaluation which is depicted in FIG. 1. After this first pass the particle sizes are not completely uniform (1). Approximately 10% of the particles are between 2 and 2.5 microns in diameter. These large particles facilitate coalescence and thus deterioration of the system.

Figure 2:
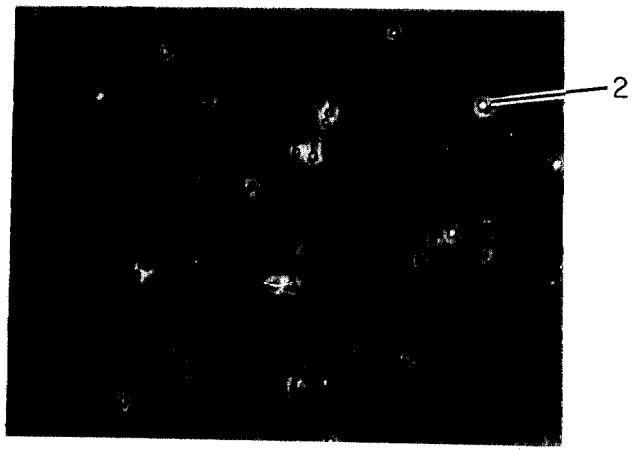
FIG. 2 depicts a photomicrograph of an emulsion containing glyceryl tri-caprylate/caprate and a brominated sucrose polyester oil after two passes through a Gaulin Homogenizer.

The mixture was then homogenized as above for a second time. The particle size was then again determined via microscopic evaluation which is depicted in FIG. 2. After this second pass the particle sizes are significantly more uniform (2). Approximately 90% of the particles are less than 1 micron in diameter, an acceptable particle size.

The mixture was then added at 0.04% by weight to a carbonated citrus beverage and tasted. The beverage was found to be unmodified in flavor. It did not possess the characteristic taste of beverages containing conventional citrus opacifiers containing terpene oils. Upon standing, the beverage opacifier did not separate out. The beverage remained opaque.

EXAMPLE 2

Example 2 demonstrates a flavored beverage opacifier of the present invention. A flavor emulsion is combined with the beverage opacifier.

The first solution of Example 1 is made containing sodium benzoate, distilled water, gum arabic, and anhydrous citric acid. Simultaneous with the preparation of that mixture a second solution is made consisting of a mixture of flavor oils in the following amounts:

Oil mandarin expressed: 168.42 grams
Oil orange expressed: 23.96 grams
Oil bitter orange: 4.8 grams
Oil grapefruit: 47.94 grams This procedure yields 245.12 grams of a flavor mix, with a specific gravity of 0.85 at 60° F. The solution is then homogenized on the Gaulin Homogenizer as explained in Examples 1 and 2. The solution is passed twice through the Gaulin Homogenizer such that approximately 90% of the resulting particles are less than 1 micron in diameter. This resultant homogenized flavor oil mix is added to the beverage opacifier emulsion of Example 1 and rehomogenized via the same procedure. This mixture is then added at 0.05% to a mixed-citrus flavored drink. The beverage opacifier/flavor oil combination imparts cloudiness to the beverage and does not separate upon standing.

EXAMPLE 3

Example 3 demonstrates the manufacture of an opaque beverage by adding the beverage opacifier of the present invention to a finished transparent lemon-lime beverage.

The brominated beverage opacifier prepared as in Example 1 is added at a level of 0.05% by weight to a clear, transparent lemon-lime beverage. The resultant beverage possesses the cloudy visual qualities of a juice-containing beverage with the organoleptic character of an extract lemon-lime flavored beverage.

What is claimed is:

1. A beverage opacifier comprising:
   (a) one or more triglyceride fats as a clouding agent; and
   (b) one or more weighting agents selected from the group consisting of sucrose esters and brominated polyol fatty acid esters having at least 4 fatty acid ester groups, wherein the polyol is selected from the group consisting of sugars and alcohols containing at least 4 hydroxyl groups, and wherein each fatty acid group has from about 8 to about 22 carbon atoms;
   (c) wherein the ratio of said clouding agent to said weighting agent is from about 250:1 to about 1:2.

2. The composition of claim 1 wherein the clouding agent is a fluid fat selected from the group consisting of coconut, soybean, apricot kernel, olive, corn, safflower, sunflower, cottonseed, canola, rapeseed, sesame seed, peanut, palm, nasturtium seed, tiger seed, rice bran, wallflower and mustard seed, or mixtures thereof.

3. The composition of claim 2 wherein the clouding agent is a fat which is substantially saturated.

4. The composition of claim 2 wherein the clouding agent is a fluid fat having an iodine value of less than 25.

5. The composition of claim 2 wherein the clouding agent is a fractionated coconut oil.

6. The composition of claim 2 wherein the clouding agent is glyceryl tri-caprylate/caprate.

7. The composition of claim 1 wherein the weighting agent is sucrose acetate isobutyrate.

8. A beverage concentrate containing from about 1% to about 75% by weight of the beverage opacifier of claim 1.

9. A beverage syrup containing from about 0.005% to about 0.4% by weight of the beverage opacifier of claim 1.

10. A carbonated beverage containing from about 0.0008% to about 0.1% by weight of the beverage opacifier of claim 1.

11. A noncarbonated beverage containing from about 0.0008% to about 0.1% by weight of the beverage opacifier of claim 1.

12. A beverage opacifier emulsion comprising:
    (a) from about 0.1% to about 25% of a triglyceride fat as a clouding agent;
    (b) from about 1% to about 30% emulsifier;
    (c) from about 1% to about 20% of a weighting agent; and
    (d) from about 25% to about 97.9% water.

13. The beverage opacifier emulsion of claim 12 wherein the clouding agent is a fluid fat selected from the group consisting of terpenes, coconut, soybean, apricot kernel, olive, corn, safflower, sunflower, cottonseed, canola, rapeseed, sesame seed, peanut, palm, nasturtium seed, tiger seed, rice bran, wallflower and mustard seed, or combinations thereof.

14. The beverage opacifier of claim 12 wherein the clouding agent is a fat which is substantially saturated.

15. The beverage opacifier emulsion of claim 12 wherein the clouding agent has an iodine value of less than 25.

16. The beverage opacifier emulsion of claim 15 wherein the clouding agent is glyceryl tri-caprylate/caprate.

17. A beverage opacifier emulsion according to claim 12 wherein the emulsifier is selected from the group consisting of gum acacia, gum ghatti, modified gum ghatti, modified food starch, carboxymethylcellulose, xanthan gum, tragacanth gum, or guar gum.

18. A beverage opacifier emulsion according to claim 12 wherein the weighting agent is selected from the group consisting of brominated vegetable oil, glycerol ester of wood rosin, sucrose acetate isobutyrate and other sucrose esters, gum damar, colophony, gum elemi, and brominated polyol fatty acid polyester.

19. A beverage opacifier emulsion according to claim 18 wherein the weighting agent comprises brominated polyol fatty acid polyester having at least 4 fatty acid ester groups, wherein the polyol is selected from the group consisting of sugars and alcohols containing at least 4 hydroxyl groups, and wherein each fatty acid group has from about 8 to about 22 carbon atoms.

20. A beverage concentrate containing from about 1% to about 75% by weight of the emulsion of claim 12.

21. A beverage syrup containing from about 0.005% to about 0.4% by weight of the emulsion of claim 12.

22. A carbonated beverage containing from about 0.0008% to about 0.1% of the beverage opacifier of claim 12.

23. A noncarbonated beverage containing from about 0.0008% to about 0.1% of the beverage opacifier of claim 12.

24. The beverage opacifier of claim 12 additionally comprising from about 0.1% to about 50% by weight of a flavor.

25. The composition of claim 24 wherein the flavor is an artificial or natural flavor selected from the group consisting of fruit, cola, tea, coffee, meat, fish, poultry, vegetable, dairy, or chocolate flavors.

26. A beverage concentrate containing the composition of claim 24.

27. A beverage syrup containing the composition of claim 24.

28. A carbonated beverage containing the composition of claim 24.

29. A noncarbonated beverage containing the composition of claim 24.

30. The beverage opacifier emulsion of claim 12 in spray-dried form.

31. The composition of claim 24 in spray-dried form.

* * * * *

UNITED STATES PATENT AND TRADEMARK OFFICE
CERTIFICATE OF CORRECTION

PATENT NO.    : 4,705,691
DATED         : November 10, 1987
INVENTOR(S)   : Kupper et al.

It is certified that error appears in the above-identified patent and that said Letters Patent is hereby corrected as shown below:

Title page,
Item [*] Notice, should read -- This patent is subject to a terminal disclaimer. --

Signed and Sealed this

Twenty-fourth Day of August, 2004

JON W. DUDAS
*Director of the United States Patent and Trademark Office*